United States Patent
Belz et al.

(10) Patent No.: US 7,301,562 B2
(45) Date of Patent: Nov. 27, 2007

(54) IMAGING SYSTEM WITH DELAYED VERIFICATION IMAGE PRESENTATION

(75) Inventors: Steven M. Belz, Pittsford, NY (US); Arlene T. Jourdan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 825 days.

(21) Appl. No.: 10/360,109

(22) Filed: Feb. 6, 2003

(65) Prior Publication Data

US 2004/0155967 A1 Aug. 12, 2004

(51) Int. Cl.
*H04N 5/225* (2006.01)

(52) U.S. Cl. .............................. 348/207.99; 348/211.99

(58) Field of Classification Search ........... 348/211.99, 348/333.01
See application file for complete search history.

(56) References Cited

U.S. PATENT DOCUMENTS

| | | | |
|---|---|---|---|
| 3,971,065 A | 7/1976 | Bayer | |
| 4,038,675 A | 7/1977 | Kital et al. | |
| 4,268,154 A | 5/1981 | Daitoka | |
| 4,456,931 A | 6/1984 | Toyoda et al. | |
| 4,571,627 A | 2/1986 | Stempeck | |
| 4,642,678 A | 2/1987 | Cok | |
| 4,714,962 A | 12/1987 | Levine | |
| 4,742,369 A | 5/1988 | Ishii et al. | |
| 4,827,347 A | 5/1989 | Bell | |
| 4,903,056 A | 2/1990 | Kamikubota et al. | |
| 4,949,117 A | 8/1990 | Heyningen et al. | |
| 5,016,107 A | 5/1991 | Sasson et al. | |
| 5,023,650 A | 6/1991 | Hoshino et al. | |
| 5,154,831 A | 10/1992 | Darian et al. | |
| 5,164,831 A | 11/1992 | Kuchta et al. | |
| 5,345,288 A | 9/1994 | Kobayashi et al. | |
| 5,373,322 A | 12/1994 | Laroche et al. | |
| 5,440,369 A | 8/1995 | Tabata et al. | |
| 5,541,656 A | 7/1996 | Kare et al. | |
| 5,668,597 A | 9/1997 | Parulski et al. | |
| 5,715,483 A | 2/1998 | Omata et al. | |
| 5,874,994 A | 2/1999 | Xie et al. | |
| 5,877,809 A | 3/1999 | Omata et al. | |
| 6,067,114 A | 5/2000 | Omata et al. | |
| 6,361,853 B1 | 3/2002 | Shaw-Klein et al. | |
| 6,441,854 B2 | 8/2002 | Fellegara et al. | |
| 6,501,908 B1 | 12/2002 | Maruyama | |
| 6,853,403 B1* | 2/2005 | Inoue et al. ........... 348/333.11 |
| 6,937,281 B1* | 8/2005 | Ogawa ................. 348/333.12 |
| 7,038,715 B1* | 5/2006 | Flinchbaugh .......... 348/207.99 |

* cited by examiner

*Primary Examiner*—Lin Ye
*Assistant Examiner*—Dillon Durnford-Geszvain (57) ABSTRACT

An imaging system and method are provided. In accordance with the method a trigger signal is detected and an image of a scene is captured in response to the trigger signal. The image is presented. A verification mode is determined and the presentation of the captured image is ended at a first ending time when a first verification mode is determined the presentation of the captured image is ended at a second ending time when a second verification mode is determined.

9 Claims, 5 Drawing Sheets

IMAGING SYSTEM WITH DELAYED VERIFICATION IMAGE PRESENTATION

FIELD OF THE INVENTION

The present invention relates to imaging systems that capture images and present verification images.

BACKGROUND OF THE INVENTION

Many digital and hybrid cameras have an electronic display screen that can be used to present an electronic version of a captured image. This allows a user to verify that the captured image has an acceptable appearance while still at the image capture scene.

Cameras are known that provide a camera user with such a verification image on demand. For example, commonly assigned U.S. Pat. No. 6,441,854 entitled "Electronic Camera with Quick Review of Last Captured Image" filed by Fellegara et al. on Feb. 20, 1997 describes a camera that incorporates a working memory for storing a working image corresponding to the last captured image. The working image is displayed on a display screen in a quick review mode of operation in response to a quick review signal entered by the camera operator. The display screen is kept in an inactive state until the quick review signal is entered, and returns to an inactive state after a predetermined time period or when the quick review signal is discontinued thereby conserving energy. In addition, the working image is displayed in the quick review mode regardless of whether a removable memory medium is attached to the camera or, in the case of a hybrid camera, whether a film cartridge is contained in the camera.

Cameras are also known that automatically present a verification image for a period of time beginning immediately after capture. One example of such a camera is described in commonly assigned U.S. patent application Ser. No. 09/012,144, entitled "Electronic Camera with Quick View and Quick Erase Features" filed by Napoli et al. on Jan. 22, 1998. However, in certain photographic circumstances it can be anticipated that the user of such a camera will not be available to review the image within the time period allotted for presentation of the verification image in the quick view mode. For example, cameras having self-timers have been known for many years. Some self-timing cameras have a mechanical self-timer with clockwork type arrangements inside the camera to capture an image at the end of a delay period. An example of such a mechanical system is shown in U.S. Pat. No. 4,268,154 entitled "Self-timer device for a Camera" filed by Daitaku on Feb. 1, 1980. Other cameras use electronic systems such as timing circuits and microprocessors to cause a camera to capture an image at the end of a delay period. An example of such an electrical system is shown in U.S. Pat. No. 4,038,675 entitled "System for Indicating the Operation of a Self-timer in an Electronic Shutter for a Camera" filed by Kitai et al. on Mar. 14, 1975. In digital imaging systems such as digital still cameras, a camera microprocessor is typically programmed to perform this function.

A principal function of the self-timer feature of such cameras is to permit the user of the camera to position the camera to capture an image of a scene and delay the actual image capture for a period of time that is long enough to permit the user to position herself in the scene. Accordingly, for the camera user to observe the verification image, it is necessary for the camera user to travel from the scene back to the camera. Frequently, by the time the user returns to the camera, the time period for presenting the evaluation image has expired. Thus, the user manually recalls the verification image and waiting for the verification image to be presented. This can impose an unnecessary drain on the camera batteries as the display presents the verification image twice.

This problem can also arise in other image capture modes such as where a camera has a remote control arrangement that permits a camera user to cause the camera to capture images while the camera operator is separated from the camera or where the camera is adapted to capture images in response to certain other stimuli that are indicative of situations where the camera operator is unavailable for immediate review of a verification image.

Thus, what is needed is a camera that automatically provides verification images for review at a time that is most likely to be useful to a photographer.

SUMMARY OF THE INVENTION

In one aspect of the invention, a method for operating an imaging system is provided. In accordance with this method, a trigger signal is detected and an image of a scene is captured in response to the trigger signal. The image is presented. A verification mode is determined and the presentation of the captured image is ended at a first ending time when a first verification mode is determined the presentation of the captured image is ended at a second ending time when a second verification mode is determined.

In another aspect of the invention, a method for operating an imaging system is provided. In accordance with the method a trigger signal is detected and a separated capture mode signal is detected. An image is captured in response to the trigger signal. An evaluation image that corresponds to the archival image is provided and the evaluation image is presented. The presentation of the evaluation image is ended at a first ending time after the trigger signal when a separated capture mode signal is not detected and the presentation of the evaluation image is ended at a second ending time after the trigger signal when a separated capture mode signal is detected. Wherein, the second ending time is after the first ending time.

In still another aspect of the invention, a method for operating an imaging system is provided. In accordance with the method a self-timer signal is detected and a trigger signal is detected. An archival image is captured at a predetermined period of time after the trigger signal. An evaluation image is formed based upon the archival image for presentation on a display. The evaluation image is stored in a buffer memory and it is determined whether a self-timer mode signal has been generated. The evaluation image is displayed within a first time period when the self-timer signal is not detected and the evaluation image is displayed within a second time period when the separated capture mode signal is detected; wherein the second time period extends beyond the first time period.

In a further aspect of the invention, an imaging system is provided. The imaging system has a trigger system having a trigger circuit generating a trigger signal and an image capture system adapted to capture an image of a scene in response the trigger signal. A display is provided for presenting images. A processor is adapted to receive the captured image, to form an evaluation image for presentation on the display, and to cause the display to present the evaluation image. Wherein said processor determines a verification mode and ends the presentation of the captured image at a first time when a first verification mode is determined and ends the presentation of the evaluation image at second time when a second verification mode is determined.

In still another aspect of the invention, an imaging system is provided. The imaging system has a separated capture mode detector and trigger system having a trigger circuit adapted to generate a trigger signal. An image capture system adapted to capture an archival image in response to a trigger signal and display for presenting images are also provided. A processor receives the captured archival image, processes the captured archival image to form an evaluation image and causes the display to present the evaluation image. Wherein the processor ends presentation of the evaluation image at a first ending time after the trigger signal when a separated capture mode signal is not detected and ends presentation of the captured image at a second ending time after the trigger signal when a separated capture mode signal is detected; and wherein the second ending time is after the first ending time.

In yet another aspect of the invention, an imaging system is provided. The imaging system has a self-timer mode input generating a self-timer mode selection signal and a trigger system having a trigger circuit generating a trigger signal. An image capture system for capturing an archival image of the scene in response to a capture signal and a display for presenting an image are also provided. A processor receives the archival image and forms an evaluation image based upon the archival image. Wherein the processor detects whether a self-timer mode selection signal has been generated and generates a capture signal at a predetermined period of time after the trigger signal when the self-timer mode is selected and wherein the processor causes the evaluation image to be displayed within a first time period when the self-timer mode is not selected and a second time period when the self-timer mode is selected with the second time period extending beyond the first time period.

In still another aspect, an image capture system for capturing and displaying images is provided. The image capture system has a mode selector, a trigger generating a trigger signal and an image capture unit for capturing images. A display is provided for presenting captured images. A processor means causes the image capture unit to capture an image of the scene in response to the trigger signal with the processor means further being adapted to cause a captured image to be presented on a display either within a first time period or within a second time period that extends beyond the first time period. Wherein the processor means selects the time period for presentation of the captured image based upon the selected mode.

DETAILED DESCRIPTION OF THE INVENTION

Figure 1:
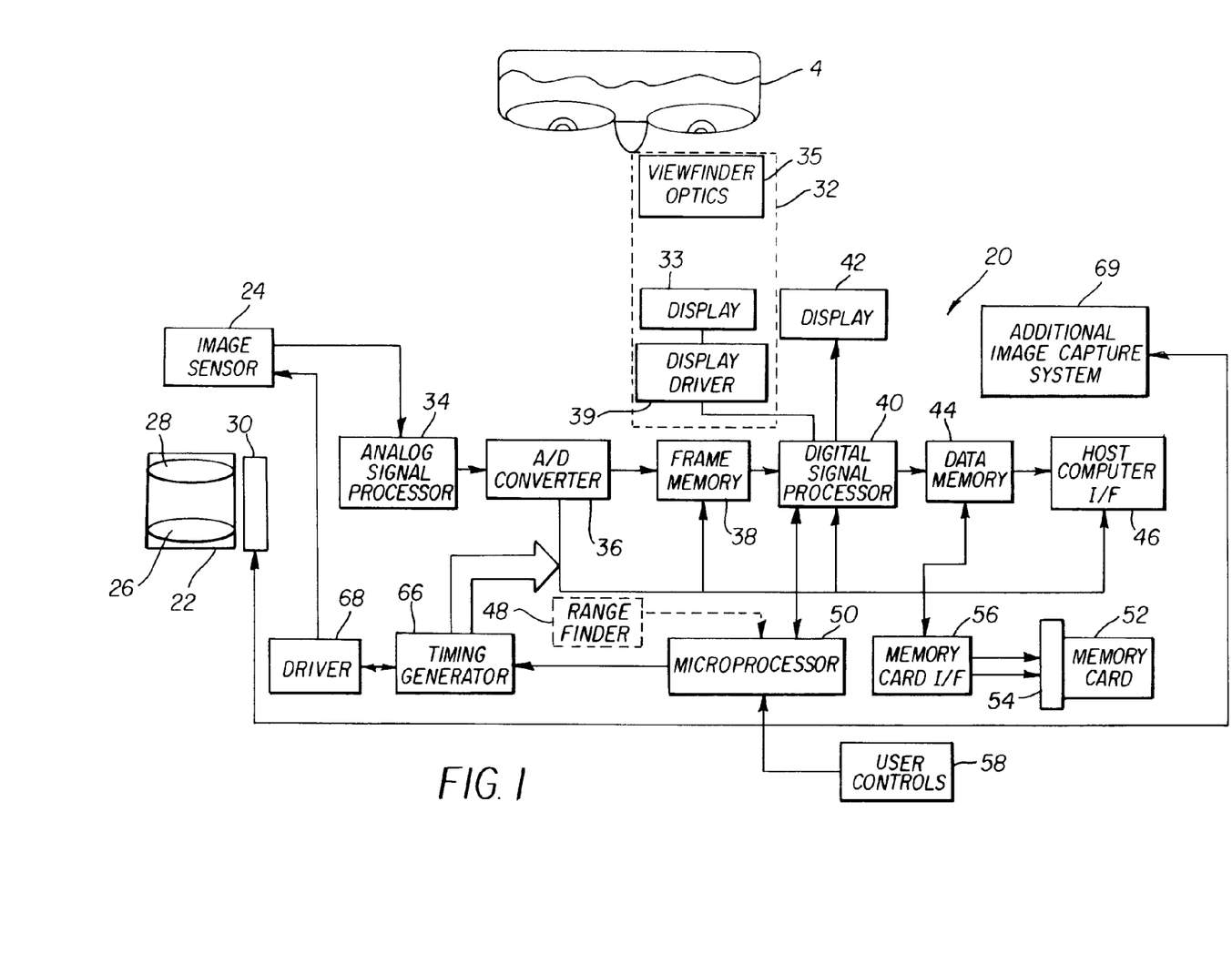
FIG. 1 is an illustration of one simplified block diagram of one exemplary embodiment of an imaging system according to the present invention.

FIG. 1 shows a block diagram of an embodiment of an imaging system 20 for capturing digital images. As is shown in FIG. 1, imaging system 20 includes a taking lens unit 22, which directs light from a subject (not shown) to form an image on an image sensor 24.

The taking lens unit 22 can be simple, such as having a single focal length with manual focusing or a fixed focus. In the example embodiment shown in FIG. 1, taking lens unit 22 is a motorized 2× zoom lens unit in which a mobile element or combination of elements 26 are driven, relative to a stationary element or combination of elements 28 by lens driver 30. Lens driver 30 controls both the lens focal length and the lens focus position of taking lens system 22 by controlled adjustment of element or elements 26. A viewfinder system 32 is provided. In the embodiment shown, viewfinder system 32 presents images captured by image sensor 24 to user 4 to help user 4 to compose images. The operation of this embodiment of viewfinder system 32 will be described in greater detail below. However, it will be appreciated that viewfinder system 32 can also comprise a conventional optical viewfinder system.

Various methods can be used to determine the focus settings of the taking lens unit 22. In a preferred embodiment, image sensor 24 is used to provide multi-spot auto-focus using what is called the "through focus" or "whole way scanning" approach. The scene is divided into a grid of regions or spots, and the optimum focus distance is determined for each image region. The optimum focus distance for each region is determined by moving taking lens unit 22 through a range of focus distance positions, from the near focus distance to the infinity position, while capturing images. Depending on the camera design, between four and thirty-two images may need to be captured at different focus distances. Typically, capturing images at eight different distances provides suitable accuracy.

The captured image data is then analyzed to determine the optimum focus distance for each image region. This analysis begins by bandpass filtering the sensor signal using one or more filters, as described in commonly assigned U.S. Pat. No. 5,874,994 entitled "Filter Employing Arithmetic Operations for an Electronic Synchronized Digital Camera" filed by Xie et al., on Dec. 11, 1995, the disclosure of which is herein incorporated by reference. The absolute value of the bandpass filter output for each image region is then peak detected, in order to determine a focus value for that image region, at that focus distance. After the focus values for each image region are determined for each captured focus distance position, the optimum focus distances for each image region can be determined by selecting the captured focus distance that provides the maximum focus value, or by estimating an intermediate distance value, between the two measured captured focus distances which provided the two largest focus values, using various interpolation techniques.

The lens focus distance to be used to capture the final high-resolution still image can now be determined. In a preferred embodiment, the image regions corresponding to a target object (e.g. a person being photographed) are determined. The focus position is then set to provide the best focus for these image regions. For example, an image of a scene can be divided into a plurality of subdivisions. A focus evaluation value representative of the high frequency component contained in each subdivision of the image can be determined and the focus evaluation values can be used to determine object distances as described in commonly assigned U.S. Pat. No. 5,877,809 entitled "Method Of Automatic Object Detection In An Image", filed by Omata et al. on Oct. 15, 1996, the disclosure of which is herein incorporated by reference. If the target object is moving, object tracking may be performed, as described in commonly assigned U.S. Pat. No. 6,067,114 entitled "Detecting Compositional Change in Image" filed by Omata et al. on Oct. 26, 1996, the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", filed by Omata et al. on Oct. 11, 1998, the disclosure of which is herein incorporated by reference.

In one embodiment, the bandpass filtering and other calculations used to provide autofocus in imaging system 20 are performed by digital signal processor 40. In this embodiment, imaging system 20 uses a specially adapted image sensor 24, as is shown in commonly assigned U.S. Pat. No. 5,668,597 entitled "Electronic Camera With Rapid Autofocus Upon An Interline Image Sensor", filed by Parulski et al. on Dec. 30, 1994, the disclosure of which is herein incorporated by reference, to automatically set the lens focus position. As described in the '597 patent, only some of the lines of sensor photoelements (e.g. only ¼ of the lines) are used to determine the focus. The other lines are eliminated during the sensor readout process. This reduces the sensor readout time, thus shortening the time required to focus taking lens unit 22.

In an alternative embodiment, imaging system 20 uses a separate optical or other type (e.g. ultrasonic) of rangefinder 48 to identify the subject of the image and to select a focus position for taking lens unit 22 that is appropriate for the distance to the subject. Rangefinder 48 can operate lens driver 30 directly or as is shown in the embodiment of FIG. 1, rangefinder 48 can provide data to microprocessor 50. Microprocessor 50 uses this data to determine how to move one or more mobile elements 26 of taking lens unit 22 to set the focal length and lens focus position of taking lens unit 22. Microprocessor 50 causes lens driver 30 to adjust the at least one element 26 to set the focal length and lens focus position of taking lens unit 22. In the embodiment of FIG. 1, a feedback loop is established between lens driver 30 and microprocessor 50 so that microprocessor 50 can accurately set the focal length and the lens focus position of taking lens unit 22.

Rangefinder 48 can be passive or active or a combination of the two. A wide variety of suitable multiple sensor rangefinders 48 known to those of skill in the art are suitable for use. For example, U.S. Pat. No. 5,440,369 entitled "Compact Camera With Automatic Focal Length Dependent Exposure Adjustments" filed by Tabata et al. on Nov. 30, 1993, the disclosure of which is herein incorporated by reference, discloses such a rangefinder 48. The focus determination provided by rangefinder 48 can be of the single-spot or multi-spot type. Preferably, the focus determination uses multiple spots. In multi-spot focus determination, the scene is divided into a grid of regions or spots, and the optimum focus distance is determined for each spot.

Image sensor 24 has a discrete number of photosensitive elements arranged in a two-dimensional array. Each individual photosite on image sensor 24 corresponds to one pixel of the captured digital image, referred to herein as an initial image. Image sensor 24 can be a conventional charge coupled device (CCD) sensor, a complementary metal oxide semiconductor image sensor and/or a charge injection device. In one example embodiment, image sensor 24 has an array of 1280×960 photosensitive elements. The photosensitive elements, or photosites, of image sensor 24 convert photons of light from the scene into electron charge packets. Each photosite is overlaid with a color filter array, such as the Bayer color filter array described in commonly assigned U.S. Pat. No. 3,971,065, entitled "Color Imaging Array" filed by Bayer on Mar. 7, 1975, the disclosure of which is herein incorporated by reference. The Bayer color filter array has 50% green pixels in a checkerboard mosaic, with the remaining pixels alternating between red and blue rows. The photosites respond to the appropriately colored incident light illumination to provide an analog signal corresponding to the intensity of illumination incident on the photosites. Various other color filters can be used. A color filter can be omitted where image sensor 24 is used to capture gray scale or so-called black and white images.

The analog output of each pixel is amplified by an analog amplifier (not shown) and are analog processed by an analog signal processor 34 to reduce the output amplifier noise of image sensor 24. The output of analog signal processor 34 is converted to a captured digital image signal by an analog-to-digital (A/D) converter 36, such as, for example, a 10-bit A/D converter which provides a 10 bit signal in the sequence of the Bayer color filter array.

The digitized image signal is temporarily stored in a frame memory 38, and is then processed using a programmable digital signal processor 40 as described in commonly assigned U.S. Pat. No. 5,016,107 filed by Sasson et al. on May 9, 1989, entitled "Electronic Still Camera Utilizing Image Compression and Digital Storage" the disclosure of which is herein incorporated by reference. The image processing includes an interpolation algorithm to reconstruct a full resolution color image from the color filter array pixel values using, for example, the methods described in commonly assigned U.S. Pat. Nos. 5,373,322 entitled "Apparatus and Method for Adaptively Interpolating a Full Color Image Utilizing Chrominance Gradients" filed by LaRoche et al. on Jun. 30, 1993, and 4,642,678 entitled "Signal Processing Method and Apparatus for Producing Interpolated Chrominance Values in a Sampled Color Image Signal" filed by Cok on Feb. 3, 1986, the disclosures of which are herein incorporated by reference. White balance, which corrects for the scene illuminant, is performed by multiplying the red and blue signals by a correction factor so that they equal green for neutral (i.e. white or gray) objects. Preferably, color correction uses a 3×3 matrix to correct the camera spectral sensitivities. However, other color correction schemes can be used. Tone correction uses a set of look-up tables to provide the opto-electronic transfer characteristic defined in the International Telecommunication Union standard ITU-R BT.709. Image sharpening, achieved by spatial filters, compensates for lens blur and provides a subjectively sharper image. Luminance and chrominance signals are formed from the processed red, green, and blue signals using the equations defined in ITU-R BT.709.

Digital signal processor 40 uses the initial images to create archival images of the scene. Archival images are typically high resolution images suitable for storage, reproduction, and sharing. Archival images are optionally compressed using the JPEG (Joint Photographic Experts Group) ISO 10918-1 (ITU—T.81) standard. The JPEG compression standard uses the well-known discrete cosine transform to transform 8×8 blocks of luminance and chrominance signals into the spatial frequency domain. These discrete cosine transform coefficients are then quantized and entropy coded to produce JPEG compressed image data. This JPEG compressed image data is stored using the so-called "Exif" image format defined in the Exchangeable Image File Format version 2.2 published by the Japan Electronics and Information Technology Industries Association JEITA CP-3451. Other image processing and compression algorithms can also be used.

The archival image can be stored in data memory 44. The archival image can also be stored in a removable memory card 52. In the embodiment of FIG. 1, imaging system 20 is shown having a memory card slot 54 which holds memory card 52 and has a memory card interface 56 for communicating with memory card 52. An archival image and any other digital data can also be transmitted to a host computer or other device (not shown), which is connected to imaging system 20 through a communication module 46.

Communication module 46 can take many known forms. For example, any known optical, radio frequency or other transducer can be used. Such transducers convert image and other data into a form such as an optical signal, radio frequency signal or other form of signal that can be conveyed by way of a wireless, wired or optical network (not shown) such as a cellular, satellite, cable, telecommunication network, the internet or other communication path to a host computer or other device, including but not limited to, a printer, internet appliance, personal digital assistant, telephone, cellular telephone or television.

Digital signal processor 40 also creates smaller size digital images based upon the initial images. These smaller sized images are referred to herein as evaluation images. Typically, the evaluation images are lower resolution images adapted for display on viewfinder display 33 or exterior display 42. Viewfinder display 33 and exterior display 42 can comprise, for example, a color or gray scale liquid crystal display (LCD), organic light emitting display (OLED) also known as an organic electroluminescent display (OELD); a subset of the OLED type display that uses polymeric compounds to emit light (also known as PLED), or other type of video display can also be used.

In an image capture sequence, digital signal processor 40 can use the initial images to generate evaluation images, archival images or both. As used herein, the term "image capture sequence" can comprise at least an image capture phase and a verification phase. An optional composition phase can also be provided.

During the composition phase, microprocessor 50 sends signals to a timing generator 66 indicating that images are to be captured. Timing generator 66 is connected, generally, to the elements of imaging system 20, as shown in FIG. 1, for controlling the digital conversion, compression, and storage of the image signal. Image sensor 24 is driven by timing generator 66 via a sensor driver 68. Microprocessor 50, timing generator 66 and sensor driver 68 cooperate to cause image sensor 24 to collect charge in the form of light from a scene for an integration time that is either fixed or variable. After the integration time is complete, an image signal is provided to analog signal processor 34 and converted into initial images which can be used as evaluation images or archival images as is generally described above.

A stream of initial images is captured in this way and digital signal processor 40 generates a stream of evaluation images based upon the initial images. The stream of evaluation images is presented on viewfinder display 33 or exterior display 42. User 4 observes the stream of evaluation images and uses the evaluation images to compose an archival image. The evaluation images can be created as described using, for example, resampling techniques such as are described in commonly assigned U.S. Pat. No. 5,164,831 entitled "Electronic Still Camera Providing Multi-Format Storage Of Full And Reduced Resolution Images" filed by Kuchta et al., on Mar. 15, 1990, the disclosure of which is herein incorporated by reference. The evaluation images can also be stored, for example, in data memory 44, memory card 52 or transmitted to a separate device using communication module 46.

During the capture phase, microprocessor 50 sends a capture signal causing digital signal processor 40 to obtain an initial image and to process the initial image to form an archival image. During the verification phase, an evaluation image having an appearance that corresponds to the archival image is also formed. The corresponding evaluation image is adapted for presentation on a display such as viewfinder display 33 or exterior display 42. The corresponding evaluation image is supplied to viewfinder display 33 or exterior display 42 and is presented for a period of time. This permits user 4 to verify that the appearance of the captured archival image is acceptable.

In one alternative embodiment, the initial images that are captured by image sensor 24 are captured in the form of archival images which are then modified for use as evaluation images. In another alternative embodiment, imaging system 20 has more than one system for capturing images. For example, in FIG. 1 an optional additional image capture system 69 is shown. This additional image capture system 69 can be used for capturing archival images. The additional image capture system 69 can comprise an image capture system that records images using a high resolution digital imager or a photographic element such as film or a plate (not shown). Where an additional image capture system 69 is used, the images captured by image sensor 24 can be used as the evaluation images and an evaluation image corresponding to the archival image can be obtained and compared with the evaluation image obtained during image composition.

Figure 2:
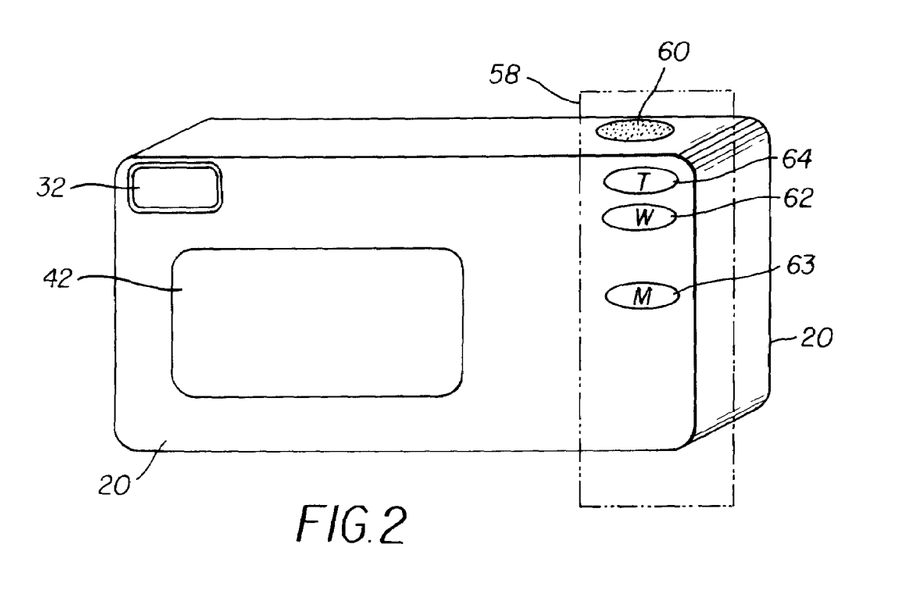
FIG. 2 is an illustration of a back view of the imaging system of FIG. 1.

Imaging system 20 is controlled by user controls 58, some of which are shown in more detail in FIG. 2. User controls 58 can comprise any form of transducer or other device capable of receiving input from user 4 and converting this input into a form that can be used by microprocessor 50 in operating imaging system 20. For example, user controls 58 can include but are not limited to touch screens, four-way, six-way, eight-way rocker switches, joysticks, styluses, track balls, voice recognition systems, gesture recognition systems and other such systems.

In the embodiment shown in FIG. 2, user controls 58 include shutter trigger button 60. User 4 indicates a desire to capture an image by depressing shutter trigger button 60. This causes a trigger signal to be transmitted to microprocessor 50. Microprocessor 50 receives the trigger signal and generates a capture signal in response to the trigger signal as will be described in greater detail below.

Figure 3:
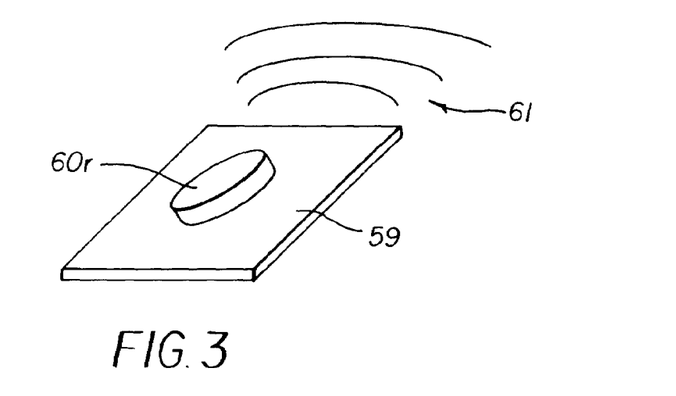
FIG. 3 is an illustration of one embodiment of a remote control device.

Shutter trigger button 60 can be fixed to imaging system 20 as is shown in FIG. 2. Optionally, as is shown in FIG. 3, a remote control device 59 can be provided. Remote control device 59 has a remote shutter trigger button 60r. Remote control device 59 reacts to the depression of remote shutter trigger button 60r by transmitting a control signal 61 to imaging system 20. When communication module 46 detects the transmitted control signal 61, communication module 46 transmits a trigger signal to microprocessor 50. Remote control device 59 can transmit control signal 61 to imaging system 20 using wireless communication systems or wired communication paths, optical communication paths or other physical connections. Microprocessor 50 responds to the trigger signal by transmitting a capture signal as is described above. Microprocessor 50 can also generate a capture signal in response to other detected stimuli such as in response to an internal or external clocking system or detected movement in the scene.

Other user controls 58 can likewise be mounted on remote control device 59. Remote control device 59 can be a dedicated remote control device and can also take many other forms, for example, any cellular telephone, a personal digital assistant, or a personal computer.

In the embodiment shown in FIG. 2, user controls 58 include a "wide" zoom lens button 62 and a "tele" zoom lens button 64, that together control both a 2:1 optical zoom and a 2:1 digital zoom feature. The optical zoom is provided by taking lens unit 22, and adjusts the magnification in order to change the field of view of the focal plane image captured by the image sensor 24. The digital zoom is provided by the digital signal processor 40, which crops and resamples the captured image stored in frame memory 38. When user 4 first turns on imaging system 20, the zoom lens is set to the 1:1 position, so that all sensor photoelements are used to provide the captured image, and the taking lens unit 22 is set to the wide angle position. In a preferred embodiment, this wide angle position is equivalent to a 40 mm lens on a 35 mm film camera. This corresponds to the maximum wide angle position.

When the user then depresses the "tele" zoom lens button 64, taking lens unit 22 is adjusted by microprocessor 50 via lens driver 30 to move taking lens unit 22 towards a more telephoto focal length. If user 4 continues to depress the "tele" zoom lens button 64, taking lens unit 22 will move to the full optical 2:1 zoom position. In a preferred embodiment, this full telephoto position is equivalent to a 40 mm lens on a 35 mm film camera. If user 4 continues to depress the "tele" zoom lens button 64, taking lens unit 22 will remain in the full optical 2:1 zoom position, and digital signal processor 40 will begin to provide digital zoom, by cropping (and optionally resampling) a central area of the image. While this increases the apparent magnification of the camera, it causes a decrease in sharpness, since some of the outer photoelements of the sensor are discarded when producing the archival image. However, this decrease in sharpness would normally not be visible on the relatively small viewfinder display 33 and exterior display 42.

For example, in imaging system 20 of FIG. 1, the captured image is derived from a high resolution image sensor 24, having for example 2448×1632 photosites, corresponding to about 4.0 megapixels. The term resolution is used herein to indicate the number of picture elements used to represent the image. Exterior display 42, however, has lower resolution providing, for example, 320×240 elements, which correspond to about 0.08 megapixels. Thus, there are about 50 times more sensor elements than display elements. Accordingly, it is necessary to resample the initial image into an evaluation image having a suitably small image size so that it can properly fit on viewfinder display 33 or exterior display 42. This resampling can be done by using low pass filtering, followed by sub-sampling, or by using bilinear interpolation techniques with appropriate anti-aliasing conditioning. Other techniques known in the art for adapting a high resolution image for display on a relatively low resolution display can alternatively be used.

The resampling of the captured image to produce an evaluation image having fewer pixels (i.e. lower resolution) than the captured image is performed by digital signal processor 40. As noted earlier, digital signal processor 40 can also provide digital zooming. In the maximum 2:1 setting, digital signal processor 40 uses a central set of the photosites of the imager to provide the archival image and interpolates the imaging information from this set of photosites to a level that approximates the imaging resolution of a higher resolution archival image.

Digital signal processor 40 can also modify the evaluation images in other ways so that the evaluation images match the appearance of a corresponding archival image when viewed on viewfinder display 33 or exterior display 42. These modifications include color calibrating the evaluation images so that when the evaluation images are presented on viewfinder system 32 or exterior display 42, the displayed colors of the evaluation image appear to match the colors in the corresponding archival image. These and other modifications help to provide user 4 with an accurate representation of the color, format, scene content and lighting conditions that will be present in a corresponding archival image.

As noted above, because evaluation images are displayed using an electronic display that has lower resolution than a corresponding archival image, an evaluation image may appear to be sharper when viewed through viewfinder display 33 or exterior display 42 than it will appear when the archival image is printed or otherwise displayed at higher resolution. Thus, in one optional embodiment of the present invention, each evaluation image can be modified so that areas that will appear out of focus in a corresponding archival image could appear to be out of focus when viewed on an electronic display such as exterior display 42. Moreover, when the digital zoom is active, the entire image is softened, but this softening would normally not be visible in exterior display 42. For example, imaging system 20 of FIG. 1, exterior display 42 can be a display having 320×240 pixels while the archival image is provided using a much larger set of imager pixels in the maximum digital zoom setting. Thus, the evaluation image displayed on exterior display 42 after normal resizing will appear suitably sharp. However, the archival image will not produce an acceptably sharp print. Therefore, as is described in commonly assigned U.S. patent application Ser. No. 10/028,644 entitled "Method and Imaging system for Blurring Portions of a Verification Image To Show Out of Focus Areas in a Captured Archival Image", filed by Belz, et al. on Dec. 21, 2001 an optional resampling technique can be used which creates an evaluation image having 320×240 pixels, but having reduced apparent sharpness when the maximum digital zoom setting is used.

It will be appreciated that the apparent sharpness of a print or other tangible output that is made from the archival image is also a function of the size of the rendered image. As is further described in the '644 application, imaging system 20 can optionally have a user input (not shown) for receiving a signal indicating the expected size of the output and can adjust the apparent sharpness of the evaluation image accordingly and/or provide a warning.

Figure 4:
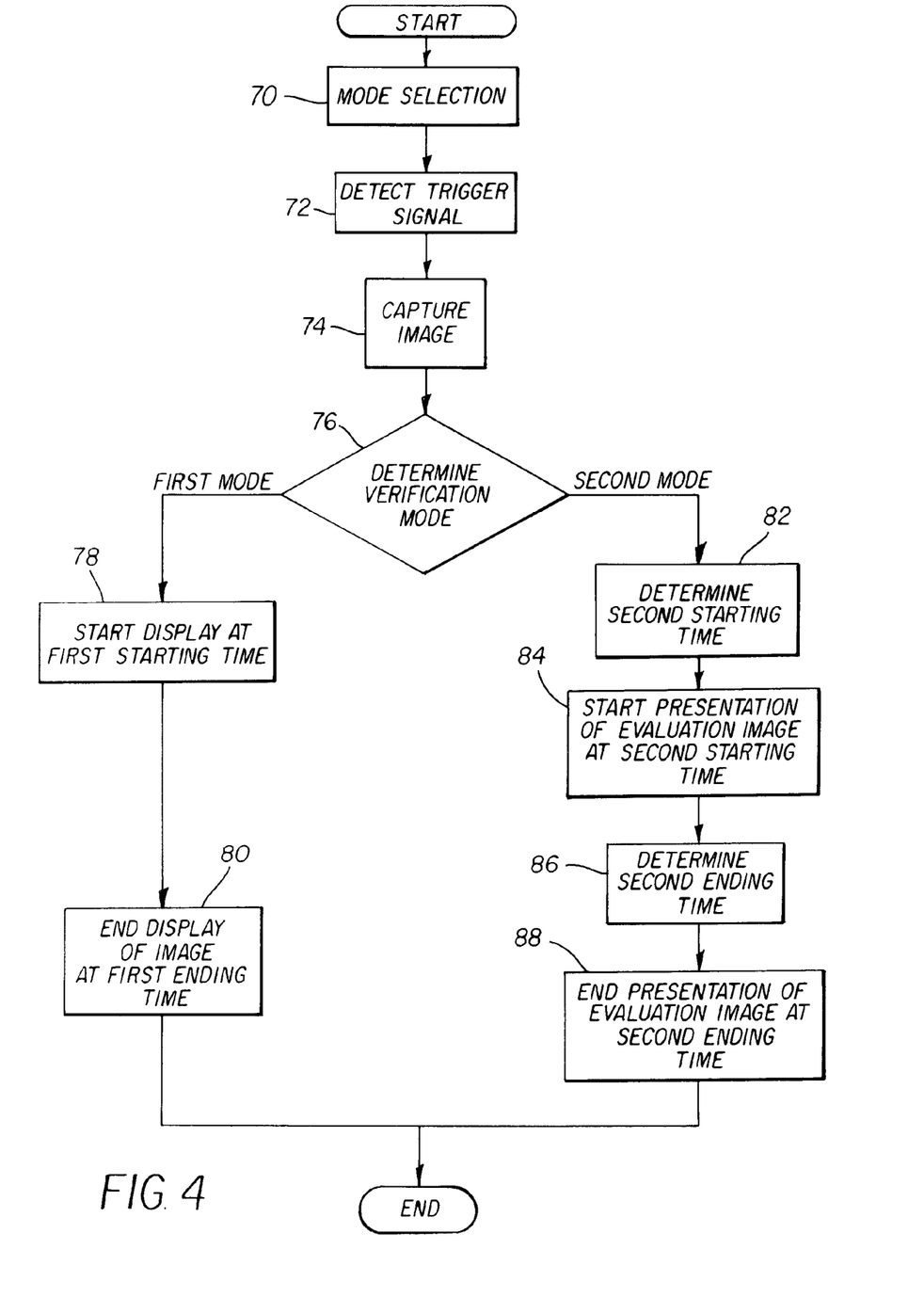
FIG. 4 is a flow diagram showing one embodiment of a method in accordance with the present invention.

FIG. 4 shows a flow diagram depicting a first embodiment of a method in accordance with the present invention. As is shown in FIG. 4, an optional mode selection input step is performed (step 70). The mode selection input can be made manually. In the embodiment shown in FIGS. 1 and 2, user controls 58 include a mode selection input 63 comprising a depression switch movable between a first position in which a first verification mode signal is generated and a second position wherein a second verification mode signal is generated.

Alternatively, mode selection input 63 and/or other user controls 58 can be used cooperatively with digital signal processor 40 and microprocessor 50 to cause a list of modes (not shown) to be displayed on viewfinder display 33 or exterior display 42. User 4 can select from among the listed modes for example, using mode selection input 63, or other user controls 58 such as an optional select button (not shown). Other forms of user controls 58 such as those described above can also be used by user 4 to select a mode. Such controls can be integrated to imaging system 20 or can be part of a remote device as described above. A mode selection signal is then stored, for example, in a memory such as data memory 44 or in a memory (not shown) in microprocessor 50.

An image capture sequence begins when a capture signal is generated by microprocessor 50 (step 72), and an image is captured in response to the capture signal (step 74). Generally, these steps are performed as described above.

Microprocessor 50 determines whether a first verification mode or a second verification mode is to be used (step 76). Microprocessor 50 can make this determination by detecting the mode selection signal generated by mode selection input 63 or by determining whether a separated capture mode was otherwise manually selected at the time of capture. Alternatively, microprocessor 50 can also automatically select between a first and a second verification mode. For example, microprocessor 50 can automatically determine that an image has been captured in a second verification mode by determining that the trigger signal has been communicated from communication module 46 or from some other source indicating that a remote control device 59 has been used to generate the trigger signal. In another automatic alternative, microprocessor 50 and/or digital signal processor 40 can be adapted to scan each evaluation image to detect the presence of user 4, for example, by detecting the face of user 4 in the captured image. When user 4 is detected in the image, microprocessor 50 can determine that a second verification mode is to be used.

Where microprocessor 50 determines that a second verification mode is to be used, microprocessor 50 causes an evaluation image that corresponds to the archival image to be formed as described above and automatically displayed for example, on viewfinder display 33 or exterior display 42 beginning at a first starting time (step 78). This first starting time typically follows the trigger signal closely and is separated from the trigger signal by an amount of time that is required to capture the archival image, prepare an evaluation image, and present the evaluation image. The relationship between the trigger signal and the first starting time is therefore generally fixed or varies within a limited range. Microprocessor 50 ends the display of the evaluation image at a first ending time (step 80).

Where microprocessor 50 determines that the second verification mode is to be used, microprocessor 50 causes an evaluation image that corresponds to the archival image to be formed as described above and a second starting time is determined for automatically displaying the corresponding evaluation image, for example, on viewfinder display 33 or exterior display 42 (step 82). The second starting time can be the same as the first starting time or, optionally, it can be different. In this regard the second starting time can be determined in various ways as will be described in greater detail below. The corresponding evaluation image is then presented beginning at the determined second starting time (step 84). However, when microprocessor 50 determines that a second verification mode is to be used, microprocessor 50 determines a second ending time that is after the first ending time (step 86) and ends the display of the evaluation image at the second ending time (step 88). Accordingly, when a second verification mode is used, an evaluation image corresponding to the captured image is presented for a period of time that extends beyond the period of time that the evaluation image is presented in the first verification mode. This can be used to provide an automatic display of the evaluation image at a time that can allow user 4 sufficient time to travel from a separated location to imaging system 20 and to find the evaluation image automatically displayed on viewfinder display 33 or exterior display 42 for an adequate period of time for review.

As noted above, there are various ways that the second starting time can be determined (step 82). The second starting time can occur at a predetermined time, which can be preprogrammed or alternatively manually set by user 4. The second starting time can also occur at a time that varies within a range of times. In this regard, imaging system 20 can be operable in more than one second verification mode with microprocessor 50 determining the second starting time for each mode based upon the selected second verification mode. For example, the second starting time can be set at one time after the first ending time when imaging system 20 is used in a self-timer mode, and set at a different time where a remote trigger mode is used for image capture.

Alternatively, the second starting time can be determined based upon photographic circumstances. For example, one verification mode can be selected when a group photo mode is used to capture an image of a number of persons. In such a mode, a number of persons may have an interest in reviewing the corresponding evaluation image. Thus, where such a mode is indicated, the second starting time can be automatically extended so that the presentation evaluation image begins after a period of time that is long enough to permit multiple persons to return to imaging system 20 to review the image.

The second starting time can be determined based upon the distance from user 4 to imaging system 20 at the time of capture. For example, in a self-timer mode, the distance from imaging system 20 to user 4 as determined during a rangefinding operation performed to focus the taking lens unit 22 during image capture can be used to determine the second starting time. Similarly where a remote control device 59 is used the distance from imaging system 20 to remote control device 59 can be determined, for example, based upon the strength of control signal 61 detected by communication module 46 and the second starting time can be determined based upon this determined distance. Other conventional ways for determining the distance from imaging system 20 to remote control device 59 can also be used.

More complex control algorithms can also be used to determine the second starting time. For example, where user 4 is detected in an archival image microprocessor 50 can cause evaluation images of the scene to be captured after the archival image has been stored. These evaluation images are analyzed to determine a second starting time. For example, the second starting time could be adjusted based upon when analysis of the evaluation images indicates that user 4 or some other person in the scene is returning to imaging system 20. A second starting time can be set to occur at a predetermined period of time after this is detected. Alternatively, the second starting time can be established by analyzing the additional images to detect when user 4 or some other person in the scene has actually returned to imaging system 20 and with the second ending time being synchronized to the detected approach of such a person. In still another alternative, rangefinder 48 can be used to scan the scene after archival image capture and to detect when user 4 or some other subject of the image leaves the scene or returns to imaging system 20 with the second starting time being established based upon these detected conditions.

Similarly, there are various ways that the second ending time can be determined (step 88). The second ending time can occur at a predetermined time after the trigger signal which can be preprogrammed or alternatively manually set by user 4. The second ending time can also occur at a time period that varies within a range of times after the first ending time. In this regard, imaging system 20 can be operable in more than one second verification mode with microprocessor 50 determining the second ending time for each mode based upon the selected one of the more than one verification mode. For example, the second ending time can be set at one time after the first ending time when imaging system 20 is used in a self-timer mode, and set at a different time after the first ending time where a remote trigger mode is used for image capture.

Alternatively, the second ending time can be determined based upon photographic circumstances. For example, one verification mode can be selected when a group photo mode is used to capture an image of a number of persons. In such a mode a number of persons may have an interest in reviewing the corresponding evaluation image. Thus, where such a mode is indicated, the second ending time can be automatically extended so that the corresponding evaluation image is presented for a period of time that is long enough for multiple persons to review the image.

The second ending time can be determined based upon the distance from user 4 to imaging system 20 at the time of capture. For example, in a self-timer mode, the distance from imaging system 20 to user 4 as determined during a rangefinding operation performed to focus the taking lens unit 22 during image capture can be used to determine the second ending time. Similarly where remote control device 59 is used, the distance from imaging system 20 to remote control device 59 can be determined, for example, based upon the strength of a control signal 61 detected by communication module 46 and the second ending time can be determined based upon this determined distance. Other conventional ways for determining the distance from imaging system 20 to remote control device 59 can also be used.

More complex control algorithms can also be used to determine the second ending time. For example, where user 4 is detected in an archival image microprocessor 50 can cause additional images of the scene to be captured after the archival image has been stored. These evaluation images are analyzed to determine a second ending time. For example, the second ending time could be adjusted based upon when analysis of the scene indicates that user 4 or some other person in the scene is returning to imaging system 20. A second ending time can be set to occur at a predetermined period of time after this is detected. Alternatively, the second ending time can be established by analyzing the additional images to detect when user 4 or some other person in the scene has actually returned to imaging system 20 and to set the second ending time based upon the detected approach of such a person. In still another alternative, rangefinder 48 can be used to scan the scene after image capture and to detect when user 4 or some other subject of the image leaves the scene or returns to imaging system 20 with the second ending time being established based upon these detected conditions.

Figure 5:
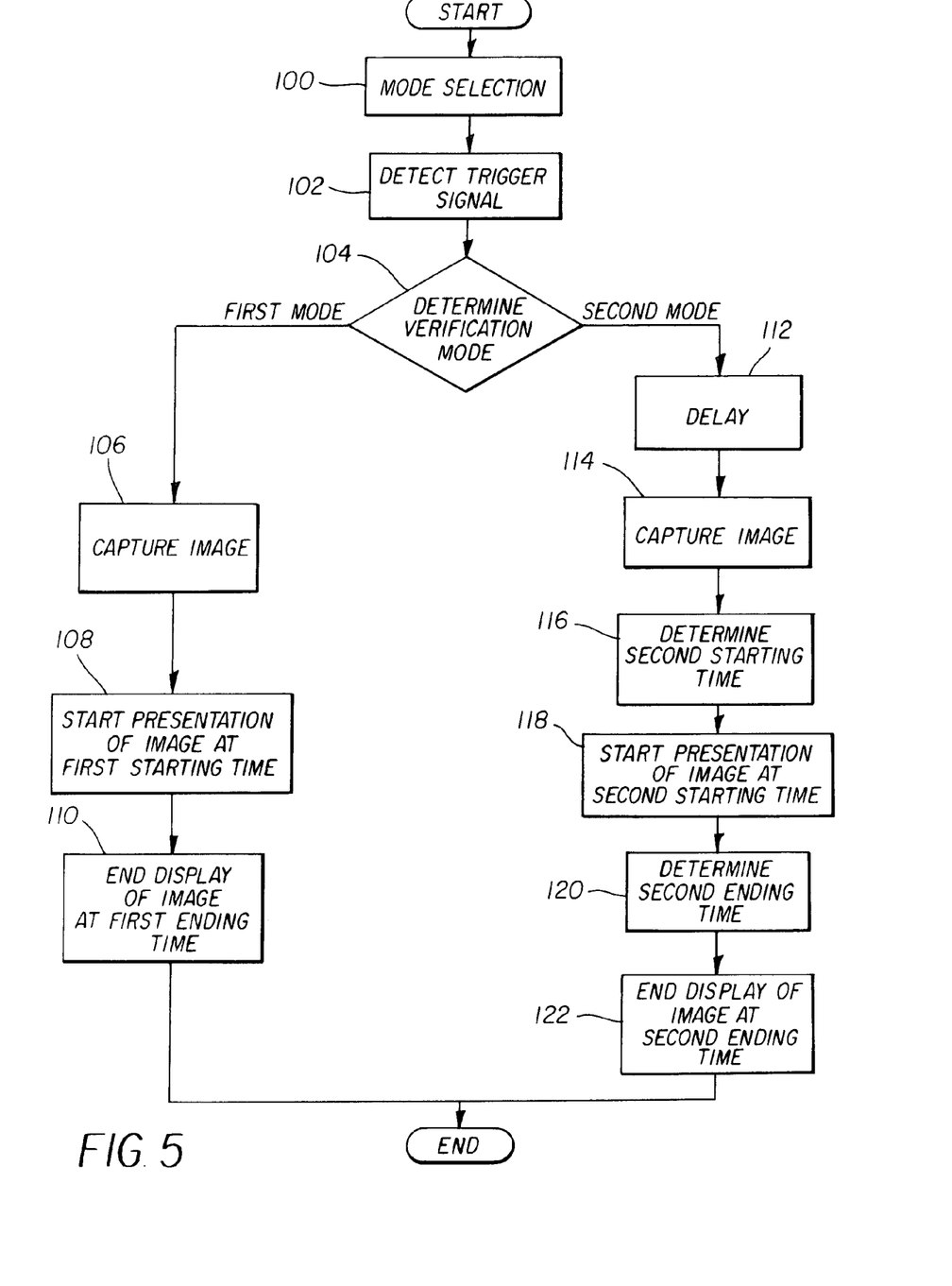
FIG. 5 is a flow diagram showing another embodiment of a method in accordance with the present invention.

FIG. 5 shows another embodiment of the method of the present invention. In this embodiment imaging system 20 is operable in a separated image capture mode and in a non-separated image capture mode. In this embodiment, a mode selection is made (step 100) and a trigger signal is then detected (step 102). The mode selection and trigger signal detection steps (steps 100 and 102) can be performed in any of the manners generally described above. Microprocessor 50 then determines a verification mode based upon whether a separated image capture mode is to be used (step 104). In the embodiment shown, this determination is made by determining that a self-timer mode is to be used. As is described above, this determination can be based upon a mode selection made by user 4 and/or based upon detected scene conditions.

Where the separated capture mode is not to be used to capture the image, microprocessor 50 responds to the trigger signal by generating a capture signal that causes an archival image to be captured (step 106). An evaluation image that corresponds to the archival image is then formed and displayed beginning at a first starting time (step 108) and ending at a first ending time (step 110).

When a separated capture mode is to be used, such as when a self-timer mode is detected, microprocessor 50 performs an optional delay step (step 112) wherein microprocessor 50 delays for a predefined period of time after the trigger signal is detected. At the conclusion of the delay, microprocessor 50 then generates the capture signal, causing an archival image to be captured (step 114). Microprocessor 50 determines a second starting time (step 116) that is after the first starting time and presents an evaluation image that corresponds to the captured archival image on viewfinder display 33 or exterior display 42 (step 118). This can be done as described above. Microprocessor 50 then determines a second ending time that is often the first ending time (step 120). This can be done as is described above. The presentation of the evaluation image is ended at the second ending time (step 122).

Presenting the evaluation image beginning at a second starting time that is after the first starting time is particularly useful in a separated capture mode because it can be assumed that when the separated capture mode is detected, user 4 is apart from imaging system 20 at the time of image capture and cannot view the presented evaluation image. Accordingly, during at least a portion of the display period, the display would be operated without user 4 observing it. This wastes energy. Thus, starting the display of the evaluation image later, avoids unnecessary operation of viewfinder display 33, exterior display 42, display driver 37 and/or digital signal processor 40. This conserves power while still automatically presenting an evaluation image to user 4 for verification purposes.

In this embodiment, the second ending time can be determined based upon the second starting time so as to ensure that the evaluation image is presented for at least a minimum amount of time and any method described above for determining a second ending time being used so long as this condition is also met.

Figure 6:
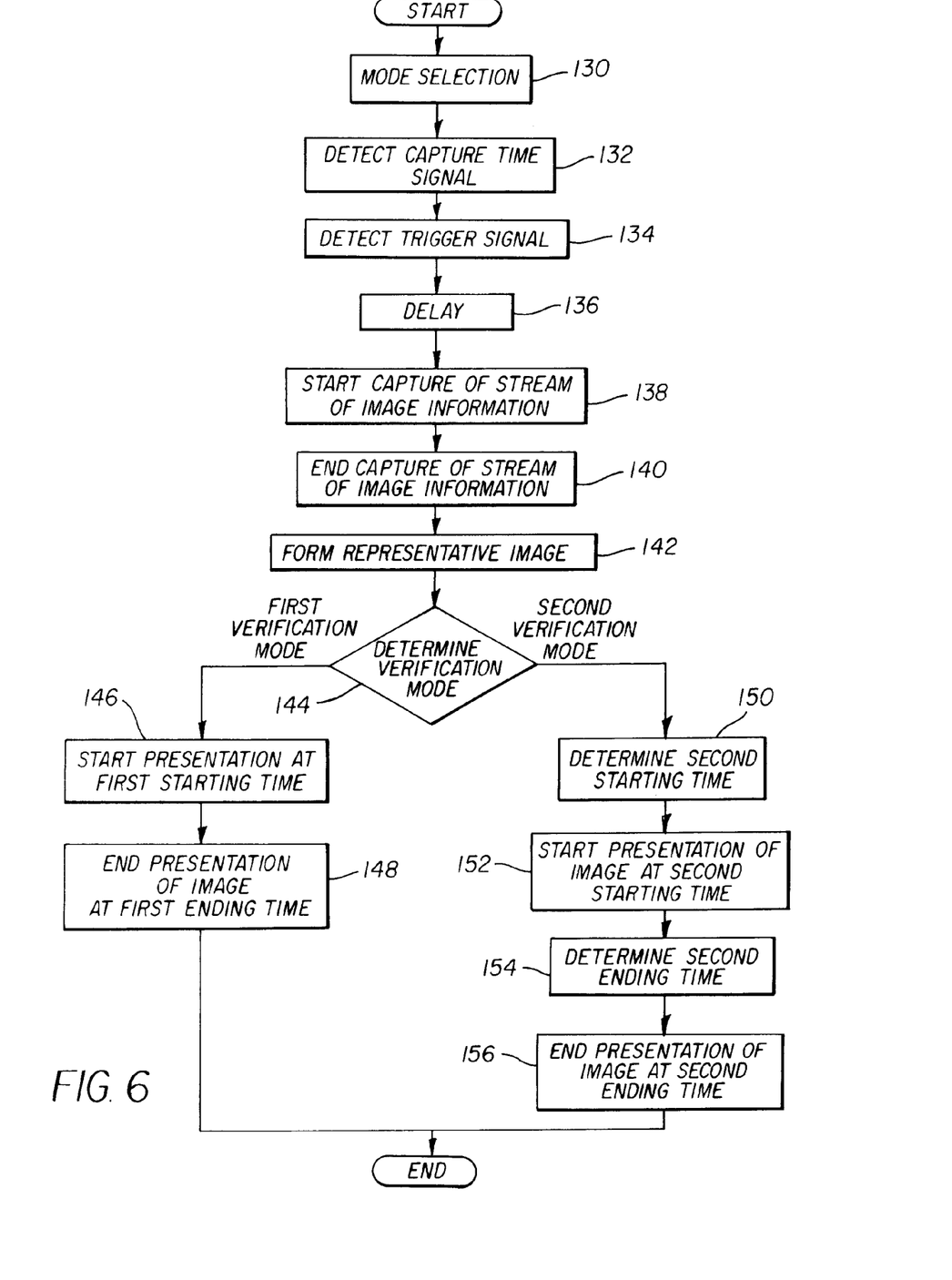
FIG. 6 is a flow diagram showing still another embodiment of a method in accordance with the present invention.

FIG. 6 shows yet another embodiment of the method of the present invention. In this embodiment, imaging system 20 is used to capture a stream of imaging information such as a conventional digital video stream. In this embodiment a separated capture mode is selected (step 130). As is shown in the embodiment of FIG. 5, user 4 can use user controls 58 to enter a capture time signal indicating the length of the video stream that is to be captured by imaging system 20 (step 132). When microprocessor 50 detects a trigger signal, (step 134) microprocessor 50 transmits a capture signal that causes imaging system 20 to capture a stream of imaging information.

The capture of the archival video stream can occur at a time that begins at or about the time that microprocessor 50 detects the trigger signal. Alternatively, as is shown in FIG. 5, an optional delay period can be interposed between the trigger signal and the capture signal (step 136). Such a delay can be used, for example, when the separated capture mode comprises a self-timer mode. The capture of an image stream then begins (step 138) and ends after an image stream equal in length to the capture time has been captured (step 140).

The image stream is optionally processed by digital signal processor 40 to form an archival image stream. This archival image stream can be compressed or otherwise processed for example, in accordance with the MPEG-1, MPEG-2, MPEG-3, or any other MPEG standard published by the Moving Picture Export Group. Alternatively, the Quicktime video format developed by Apple Computer, Inc. can be used. Other digital video compression and storage schemes can also optionally be used.

A representative frame image is derived from the archival image stream or archival stream of imaging information (step 142). This representative image frame typically comprises an image that is based upon a first frame of the image stream. The representative image can comprise a single image or multiple images. For example, the representative image can comprise a composite image, such as a four in one image, a six in one image, a nine in one image or a sixteen in one image wherein multiple thumbnail type images, each selected from a particular portion of the archival image stream, are presented in a common image frame. However, other criteria can be used to arrange or assemble a representative image.

In the embodiment shown, microprocessor 50 determines whether a first verification mode should be used (144). This step can be performed in a manner that is consistent with the methods described above. Where microprocessor 50 determines that the first verification mode should be used, the representative image is presented on viewfinder display 33 or exterior display 42 beginning at a first starting time (step 146) and ending at a second starting time (step 148). Typically, the first ending time will be separated from the capture signal by a period of time that is sufficient to allow at least processing of the captured video stream to form the representative image.

In the embodiment shown in FIG. 5, when microprocessor 50 determines that a second verification mode is to be used, microprocessor 50 determines a second starting times (step 150) causes the representative image to be presented beginning at a second starting time (step 152). Microprocessor 50 also determines a second ending time (step 154) and ends presentation at a second ending time (step 156). These steps are performed generally as described above. The second ending time ends after the first ending time. Optionally the second starting time can begin after the first starting time.

It will be appreciated that the second verification mode has been described herein as being selected based upon various considerations, such as user input, image capture mode and image content. It will be appreciated these considerations are exemplary only and that a second verification mode as described herein may be a useful expedient in many circumstances other than those described herein and that the determination as to whether to use the first or second verification mode can be made based upon other considerations not described herein.

Parts List 4 user
20 imaging system
22 taking lens unit
24 image sensor
26 element
28 element
30 lens driver
32 viewfinder system
33 viewfinder display
34 analog signal processor
36 analog to digital (A/D) converter
37 display driver
38 frame memory
40 digital signal processor
42 exterior display
44 data memory
46 communication module
48 rangefinder
50 microprocessor
52 memory card
54 memory card slot
56 memory card interface
58 user controls
59 remote control device
60 shutter trigger button
60r remote shutter trigger button
61 control signal
62 "wide" zoom lens button
63 mode selection input
64 "tele" zoom lens button
66 timing generator
68 sensor driver
69 additional image capture system
70 mode selection input step
72 detect trigger signal step
74 capture image step
76 verification mode determining step
78 present evaluation image at first starting time step
80 end presentation of evaluation image at first ending time step
82 determine second starting time step
84 start presentation of evaluation image at second starting time step
86 determine second ending time step
88 end presentation of evaluation image at second ending time step
100 mode selection step
102 detect trigger signal step
104 determine verification mode step
106 capture image step
108 start presentation of evaluation image at first starting time step
110 end presentation of evaluation image at first ending time step
112 delay step
114 capture image step
116 determine second starting time step
118 start presentation of evaluation image at second starting time step
120 determine second ending time step
122 end presentation of evaluation image at second ending time step
130 mode selection step
132 detect capture time signal step
134 detect trigger signal step
136 delay step
138 start capture of stream of images step
140 end capture of stream of images step
142 form representative image step
144 determine verification mode step 146 start presentation of evaluation image at first starting time step
148 end presentation of evaluation image of first ending time step
150 determine second ending time step
152 start presentation of evaluation image at second ending time step
154 determine second ending time step
156 start presentation of evaluation image at second ending time step

What is claimed:

1. A method for operating an imaging system, the method comprising the steps of:
    detecting a trigger signal;
    capturing an image of a scene in response to the trigger signal;
    presenting the captured image;
    determining a verification mode;
    ending the presentation of the captured image at a first ending time when a first verification mode is determined; and
    ending the presentation of the captured image at a second ending time when a second verification mode is determined, wherein the step of determining a verification mode comprises automatically determining a verification mode based upon analysis of the captured image.

2. A method for operating an imaging system, the method comprising the steps of:
    detecting a trigger signal;
    capturing an archival image of a scene in response to the trigger signal;
    presenting the captured image;
    determining a verification mode;
    ending the presentation of the captured image at a first ending time when a first verification mode is determined; and
    ending the presentation of the captured image at a second ending time when a second verification mode is determined,
    wherein the step of ending the presentation of the captured image at a second ending time comprises the steps of capturing additional images of the scene after the image has been captured, analyzing the additional images, and automatically determining the second ending time based upon the analysis of the additional images.

3. The method of claim 2, wherein said image analysis comprises analyzing such later captured images to indicate when a some person in the scene is returning to an imaging system and setting the starting or ending time of the presentation of the archival image to occur at a predetermined period of time after this is detected.

4. The method of claim 2, wherein said image analysis comprises analyzing such later captured images to detect when a person in the scene has actually returned to imaging system and synchronizing the presentation of the verification image to the detected approach of such a person.

5. The method of claim 2, wherein each evaluation image is scanned to detect the face of a user of the camera, and when the user is detected in the image, determining that a second verification mode is to be used.

6. A method for operating an imaging system, the method comprising:
    detecting a trigger signal;
    detecting a separated capture mode signal;
    capturing an archival mage in response to the trigger signal;
    providing an evaluation image that corresponds to the archival image;
    presenting the evaluation image;
    ending presentation of the evaluation image at a first ending time after the trigger signal when a separated capture mode signal is not detected; and
    ending presentation of the evaluation image at a second ending time after the trigger signal when a separated capture mode signal is detected;
    wherein the second ending time is after the first ending time, further comprising the steps of analyzing the scene captured in the archival image and determining a second ending time based upon analysis of the scene.

7. An imaging system comprising:
    a trigger system having a trigger circuit generating a trigger signal;
    an image capture system adapted to capture an image of a scene in response the trigger signal;
    a display for presenting images; and
    a processor adapted to receive the captured image, to form an evaluation image for presentation on the display, and to cause the display to present the evaluation image;
    wherein said processor determines a verification mode and ends the presentation of the captured image at a first time when a first verification mode is determined and ends the presentation of the evaluation image at second time when a second verification mode is determined; and
    wherein the processor determines the verification mode based upon analysis of the captured image.

8. An imaging system comprising:
    a trigger system having a trigger circuit generating a trigger signal;
    an image capture system adapted to capture an image of a scene in response the trigger signal;
    a display for presenting images; and
    a processor adapted to receive the captured image, to form an evaluation image for presentation on the display, and to cause the display to present the evaluation image;
    wherein said processor determines a verification mode and ends the presentation of the captured image at a first time when a first verification mode is determined and ends the presentation of the evaluation image at second time when a second verification mode is determined; and
    wherein the processor causes the image capture system to capture additional images after the image is captured and analyzes the additional images to determine the second starting time.

9. An imaging system comprising:
    a separated capture mode detector;
    a trigger system having a trigger circuit adapted to generate a trigger signal;
    an image capture system adapted to capture an archival image in response to the trigger signal;
    a display for presenting images; and,
    a processor receiving the captured archival image, processing the captured archival image to form an evaluation image and causing the display to present the evaluation image;
    wherein the processor ends presentation of the evaluation image at a first ending time after the trigger signal when a separated capture mode signal is not detected and ends presentation of the captured image at a second ending time after the trigger signal when a separated capture mode signal is detected; and wherein the second ending time is after the first ending time, and
    wherein the processor determines the amount of time that the second ending time is after the first ending time is based upon analysis of the archival image.

* * * * *